(12) United States Patent
Kim et al.

(10) Patent No.: US 10,163,276 B2
(45) Date of Patent: Dec. 25, 2018

(54) APPARATUS AND METHOD OF TRANSMITTING MESSAGES BETWEEN VEHICLES

(71) Applicant: SAMSUNG ELECTRONICS CO., LTD., Suwon-si (KR)

(72) Inventors: Tae Seok Kim, Hwaseong-si (KR); Jaewook Shim, Yongin-si (KR); Seungkeun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/248,752

(22) Filed: Aug. 26, 2016

(65) Prior Publication Data

US 2017/0132855 A1    May 11, 2017

(30) Foreign Application Priority Data

Nov. 9, 2015   (KR) .................. 10-2015-0156396

(51) Int. Cl.
*G07C 5/02* (2006.01)
*G01S 13/42* (2006.01)
(Continued)

(52) U.S. Cl.
CPC ............ *G07C 5/02* (2013.01); *G01S 13/42* (2013.01); *G01S 13/89* (2013.01); *G01S 13/931* (2013.01);
(Continued)

(58) Field of Classification Search
CPC . G07C 5/02; G01S 17/42; G01S 13/42; G01S 19/13; G01S 13/89; G01S 13/931;
(Continued)

(56) References Cited

U.S. PATENT DOCUMENTS 8,032,081 B2   10/2011  Bai et al.
2001/0026276 A1*  10/2001  Sakamoto .......... G01C 21/3638
                                           345/473

(Continued)

FOREIGN PATENT DOCUMENTS

JP          2004-280645 A   10/2004
JP           5438086 B2      3/2014
(Continued)

*Primary Examiner* — Tuan C To
(74) *Attorney, Agent, or Firm* — NSIP Law

(57) ABSTRACT

An apparatus for transmitting messages between vehicles includes a sensor configured to sense at least one of location information of a vehicle, location information of vehicles neighboring the vehicle, or vehicle information of the neighboring vehicles, an input device configured to receive a first message from a user aboard the vehicle, a processor configured to generate a map based on the at least one of the location information of the vehicle, the location information of the neighboring vehicles, and the vehicle information of the neighboring vehicles, or configured to transform the first message into a transmission message, an output device configured to output the map and the first message, and a communicator configured to transmit the transmission message to a target vehicle, and receive a second message from the neighboring vehicles comprising the target vehicle.

25 Claims, 11 Drawing Sheets

(51) Int. Cl.
*G01S 19/13* (2010.01)
*G01S 17/42* (2006.01)
*G01S 17/89* (2006.01)
*G01S 17/93* (2006.01)
*G01S 13/89* (2006.01)
*G01S 13/93* (2006.01)
*G08G 1/017* (2006.01)
*G08G 1/0967* (2006.01)

(52) U.S. Cl.
CPC .............. *G01S 17/42* (2013.01); *G01S 17/89* (2013.01); *G01S 17/936* (2013.01); *G01S 19/13* (2013.01); *G08G 1/0175* (2013.01); *G08G 1/096716* (2013.01); *G08G 1/096741* (2013.01); *G08G 1/096791* (2013.01); *G01S 2013/936* (2013.01)

(58) Field of Classification Search
CPC .. G01S 17/89; G01S 17/936; G01S 2013/936; G08G 1/096741; G08G 1/096791
See application file for complete search history.

(56) References Cited

U.S. PATENT DOCUMENTS

| | | | | |
|---|---|---|---|---|
| 2004/0128062 | A1* | 7/2004 | Ogino | G01C 21/26 701/400 |
| 2005/0232463 | A1* | 10/2005 | Hirvonen | G06K 9/3241 382/103 |
| 2006/0268916 | A1 | 11/2006 | Sarkar | |
| 2007/0032245 | A1* | 2/2007 | Alapuranen | G08G 1/161 455/456.1 |
| 2010/0198513 | A1* | 8/2010 | Zeng | B60W 40/02 701/300 |
| 2010/0256852 | A1* | 10/2010 | Mudalige | G08G 1/163 701/24 |
| 2011/0190972 | A1* | 8/2011 | Timmons | G01C 21/34 701/31.4 |
| 2012/0052870 | A1* | 3/2012 | Habicher | H04W 4/04 455/456.1 |
| 2012/0215403 | A1* | 8/2012 | Tengler | B60W 50/12 701/36 |
| 2013/0030687 | A1* | 1/2013 | Shida | G01S 5/0072 701/301 |
| 2013/0101046 | A1* | 4/2013 | Korodi | H04N 19/1883 375/240.18 |
| 2013/0191132 | A1 | 7/2013 | Tanaka | |
| 2013/0282277 | A1* | 10/2013 | Rubin | G08G 9/02 701/517 |
| 2014/0046581 | A1* | 2/2014 | Ota | G08G 1/096716 701/408 |
| 2014/0074957 | A1 | 3/2014 | Liu et al. | |
| 2014/0159886 | A1* | 6/2014 | Hasegawa | B60K 35/00 340/435 |
| 2014/0229105 | A1* | 8/2014 | Lee | G01C 21/3407 701/533 |
| 2014/0244110 | A1* | 8/2014 | Tharaldson | G07C 5/008 701/36 |
| 2014/0302774 | A1* | 10/2014 | Burke | H04H 20/57 455/3.05 |
| 2014/0335893 | A1* | 11/2014 | Ronen | G01S 5/0252 455/456.1 |
| 2015/0025708 | A1* | 1/2015 | Anderson | A61B 5/6804 701/2 |
| 2015/0210214 | A1 | 7/2015 | Hellaker et al. | |
| 2016/0016585 | A1* | 1/2016 | Park | B60W 30/12 701/41 |
| 2016/0026876 | A1* | 1/2016 | Koo | G06K 9/00798 382/103 |
| 2016/0121890 | A1* | 5/2016 | Han | B60W 30/16 701/93 |
| 2016/0264047 | A1* | 9/2016 | Patel | B60Q 9/008 |
| 2016/0297436 | A1* | 10/2016 | Shin | B60W 30/16 |
| 2016/0335897 | A1* | 11/2016 | Naserian | G08G 1/161 |
| 2016/0357188 | A1* | 12/2016 | Ansari | G05D 1/0212 |
| 2016/0370201 | A1* | 12/2016 | Pudiyathanda | G01C 21/3667 |
| 2017/0124864 | A1* | 5/2017 | Popple | G08G 1/07 |

FOREIGN PATENT DOCUMENTS

| | | | | |
|---|---|---|---|---|
| KR | 10-2006-0066201 A | | 6/2006 | |
| KR | 10-2008-0054803 A | | 6/2008 | |
| KR | 10-1212073 B1 | | 12/2012 | |
| KR | 20140030695 A | * | 3/2014 | |
| KR | 10-2015-0067464 A | | 6/2015 | |
| WO | WO-2008043795 A1 | * | 4/2008 | ............ G08G 1/163 |
| WO | WO-2013124033 A1 | * | 8/2013 | ........... G08G 1/0175 |

* cited by examiner

1020

APPARATUS AND METHOD OF TRANSMITTING MESSAGES BETWEEN VEHICLES

CROSS-REFERENCE TO RELATED APPLICATION(S)

This application claims the benefit under 35 USC 119(a) of Korean Patent Application No. 10-2015-0156396, filed on Nov. 9, 2015, in the Korean Intellectual Property Office, the entire disclosure of which is incorporated herein by reference for all purposes.

BACKGROUND

1. Field

The following description relates to an apparatus and method of transmitting messages between vehicles.

2. Description of Related Art

Communication between vehicles includes transmitting and receiving mechanical information about each vehicle via a message. The message includes a message field including safety information. The message be generated periodically or transmission is event-based, and transmitted to vehicles within a radio transmission distance. However, there are limitations to information sharing between people on the vehicles and message transmission between other users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An apparatus for transmitting messages between vehicles includes a sensor configured to sense at least one of location information of a vehicle, location information of vehicles neighboring the vehicle, or vehicle information of the neighboring vehicles, an input device configured to receive a first message from a user aboard the vehicle, a processor configured to generate a map based on the at least one of the location information of the vehicle, the location information of the neighboring vehicles, and the vehicle information of the neighboring vehicles, or configured to transform the first message into a transmission message, an output device configured to output the map and the first message, and a communicator configured to transmit the transmission message to a target vehicle, and receive a second message from the neighboring vehicles comprising the target vehicle.

The processor may be configured to extract respective features of the neighboring vehicles based on at least one of the location information of the neighboring vehicles, the vehicle information of the neighboring vehicles, or the second message, and generate the map based on the extracted features.

The processor may be configured to receive the first message comprising identification information of the target vehicle, and transform the first message into a transmission message based on the identification information of the target vehicle and the map.

The second message may include the location information of the neighboring vehicles, and the vehicle information of the neighboring vehicles, the vehicle information comprising at least one of a model, a color, an identification number, a full width, or a weight of the corresponding neighboring vehicles.

The processor is may be configured to receive information related to a neighboring vehicle transmitting the second message based on the second message, and update the map based on the received information related to the neighboring vehicle.

The processor may be configured to transform the second message into a format based on a characteristic of the output device.

The output device may be configured to output the information related to the neighboring vehicle and the transformed second message along with the map.

The output device may include at least one of a speaker, a display, or a mobile device carried by the user, and the output device may be configured to output at least one of the first message, the information related to the neighboring vehicle, or the transformed second message using at least one of the speaker, the display, or the mobile device.

In response to the output device being the mobile device, the processor is configured to transform at least one of the first message, the information related to the neighboring vehicle, or the second message into a format suitable for the mobile device.

In response to the output device being the display, the processor may be configured to transform at least one of the first message, the information related to the neighboring vehicle, or the second message into a format that uses at least one of a text, a bubble, or an icon on a map displayed on the display.

The sensor may include at least one of a global positioning system (GPS) configured to sense location information of the vehicle, a vision sensor and/or a camera configured to photograph the location information of the neighboring vehicles and the vehicle information of the neighboring vehicles, and a LIDAR or a RADAR configured to sense the location information of the neighboring vehicles and the vehicle information of the neighboring vehicles.

The processor is configured to verify identification numbers of the neighboring vehicles photographed by the vision sensor and/or the camera and vehicle information extracted from the second message, and transmit a matching result in the map.

The input device may include at least one of a microphone, a touch display, a user interface (UI) comprising a haptic interface, a mobile device carried by the user, and a mobile device carried by a passenger in the vehicle, and the input device may be configured to receive the first message from the user through at least one of the microphone, the touch display, the UI, the mobile device carried by the user, or the mobile device carried by the passenger.

A method of transmitting messages between vehicles includes obtaining at least one of location information of a vehicle, location information of vehicles neighboring the vehicle comprising a target vehicle, or vehicle information of the neighboring vehicles, generating a map based on the at least one of the location information of the vehicle, the location information of the neighboring vehicles, or the vehicle information of the neighboring vehicles, receiving a first message from a user aboard the vehicle, transforming the first message into a transmission message based on a target vehicle, and transmitting the transmission message to the target vehicle.

The method may include receiving a second message from the neighboring vehicles comprising the target vehicle.

The method may further include receiving information related to a neighboring vehicle transmitting the second message based on the second message, and updating the map based on the received information related to the neighboring vehicle.

The generating may include extracting features of the respective neighboring vehicles based on at least one of the location information of the neighboring vehicles, the vehicle information of the neighboring vehicles, or the second messages, and generating the map based on the extracted features.

The processing may include receiving the first message comprising identification information of the target vehicle, and transforming the first message into a transmission message based on the identification information of the target vehicle and the map.

The method may include transforming the second message into a format suitable for the vehicle and outputting the information related to the neighboring vehicle and the transformed second message along with the map.

A computer program using hardware and stored in a non-transitory computer-readable storage medium may cause a computer to perform the method described above.

Other features and aspects will be apparent from the following detailed description, the drawings, and the claims.

Figure 1:
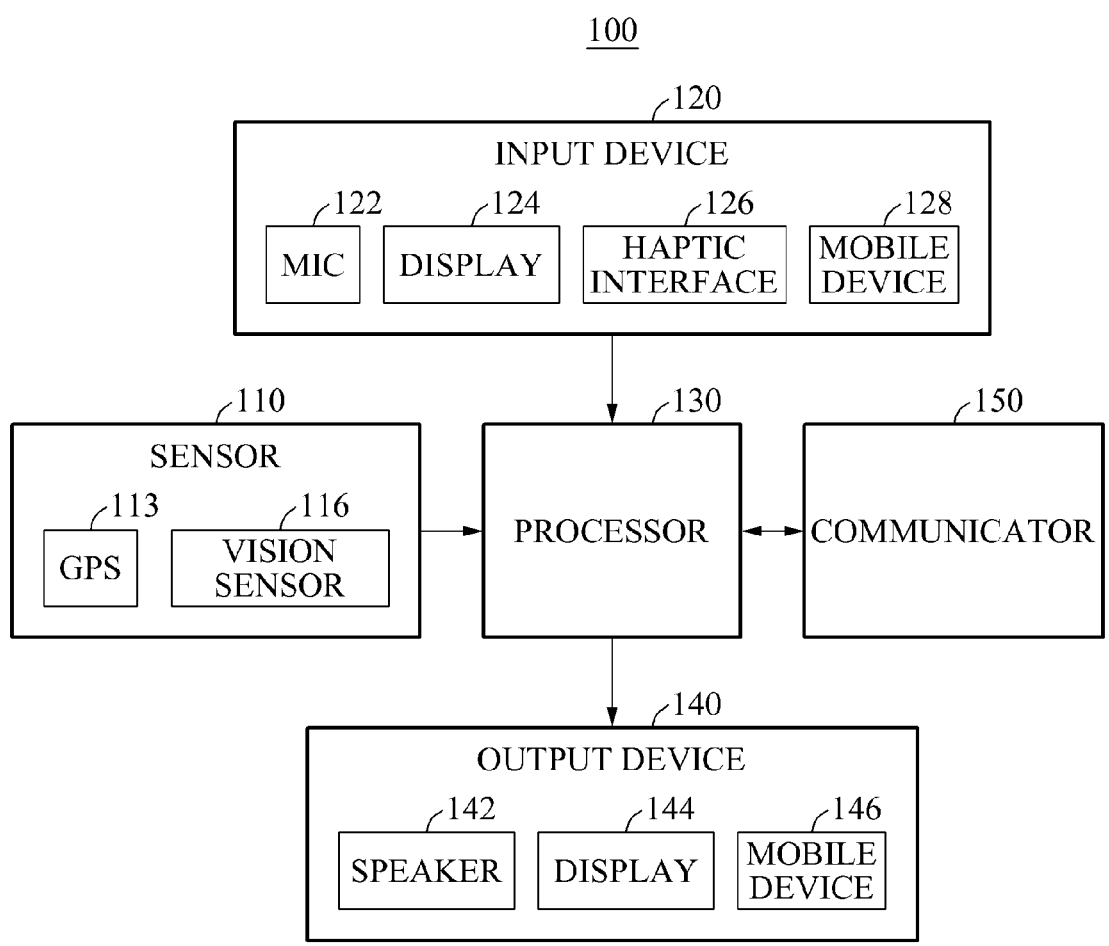
FIG. 1 is a block diagram illustrating an example of an apparatus for transmitting messages between vehicles.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art with a full understanding of the present disclosure. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art with a full understanding of the present disclosure may be omitted for increased clarity and conciseness.

The features described herein may be embodied in different forms, and are not to be construed as being limited to the examples described herein. Rather, the examples described herein have been provided so that this disclosure will be thorough and complete.

Specific structural or functional descriptions of examples provided in the present disclosure are exemplary to merely describe the examples. The examples may be modified and implemented in various forms, and the scope of the examples is not limited to the descriptions provided in the present specification.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art having a full understanding of the present invention. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As a non-exhaustive example only, device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

FIG. 1 is a block diagram illustrating an example of an apparatus for transmitting messages between vehicles. Referring to FIG. 1, an apparatus 100 for transmitting messages between vehicles (hereinafter, referred to as the "transmission apparatus") 100, includes a sensor 110, an input device 120, a processor 130, an output device 140, and a communicator 150. The sensor 110, the input device 120, the processor 130, the output device 140, and the communicator 150 communicate with each other through a bus (not shown).

The sensor 110 is configured to obtain location information of a vehicle, location information of vehicles neighboring the vehicle, and vehicle information including information about the neighboring vehicles. For example, the sensor 110 includes a global positioning system (GPS) 113 configured to determine the location of the vehicle and output location information. The sensor 110 may also include a vision sensor 116 and/or a camera configured to use photography, or other methods, to determine and output location information and/or vehicle information of the neighboring vehicles. The sensor 110 alternatively or additionally includes and a LIDAR or a RADAR system configured to sense the location and/or vehicle information of the neighboring vehicles.

The input device 120 receives, for example, a first message from a user in the vehicle aboard which the apparatus 100 is contained. Hereinafter, the user may include a driver and/or a passenger aboard the vehicle. The term "first message" may be a message transmitted from the user aboard the vehicle to users of the neighboring vehicles including a target vehicle. Although the above describes a "user" as a person aboard the vehicle, a "user" may also include messages that generated in response to an event or status of the vehicle. For example, if the vehicle experiences a malfunction that affects driving ability of the vehicle, a message is automatically generated and output to the processor.

The input device 120 includes a microphone (MIC) 122, a display 124, a haptic interface 126, and a mobile device 128. The MIC 122 is configured to receive a voice of the user. The display 124 is configured to receive an input of the user through, for example, a touch button, icon, and/or a virtual keyboard. A user interface (UI) including the haptic interface 126 receives input values corresponding to sensed tactile sensation, a force, and/or a kinesthetic sense of the user. The mobile device 128 is carried by the user and may not be physically attached to another device. That is, the mobile device 128 may be a wireless device.

The processor 130 generates a real-time map based on the location information of the vehicle, the location information of the neighboring vehicles, and the vehicle information of the neighboring vehicles that are received from the sensor 110.

The processor 130 extracts features of the respective neighboring vehicles based on at least one of the location information of the neighboring vehicles, the vehicle information of the neighboring vehicles, or vehicle-associated messages. The processor 130 generates the real-time map based the extracted features.

The processor 130 monitors, in real time, the neighboring vehicles and road infrastructures based on the extracted features related to the neighboring vehicles and the vehicle information and/or locations of the neighboring vehicles received from the sensor 110 and the communicator 150. The road infrastructures include, for example, lanes, intersections, and other details about the road the vehicle having apparatus 100 aboard. The road infrastructures may be prestored in a database included in or otherwise connected to the apparatus 100, or may be extracted based on received road infrastructure information, including, but not limited to road infrastructure information wirelessly transmitted to the apparatus 100 by a signal from a central server or from neighboring vehicles. The processor 130 reflects a monitoring result as part of the real-time map. The processor 130 processes the received information from the sensor 110 and/or the communicator 150, determines real-time location information of the vehicle and the neighboring vehicles, and stores the real-time location information in a database (not shown).

The processor 130 processes the first message input through the input device 120, and outputs a transmission message. The processor 130 interprets the first message and identification information of the target vehicle included in the first message, and processes the first message to be a transmission message suitable for the target vehicle based on the identification information of the target vehicle and the real-time map. The processor 130 verifies a type of the first message. For example, the first message may have a type such as an audio message, an image message, or a haptic message. Further the first message may be verified by the processor 130 as an instruction to input or transmit a message or message content.

The output device 140 outputs the real-time map and the first message. The output device 140 includes, for example, a speaker 142 configured to output a sound, a display 144 configured to display an image, and/or a mobile device 146 carried by the user. The output device 140 outputs at least one of the first message, information related to a neighboring vehicle transmitting a second message, or the second message processed by the processor 130 to be suitable for the output device 140 using at least one of the speaker 142, the display 144, or the mobile device 146. In an example, the output device 140 outputs the first message, the information related to the neighboring vehicle, and the processed second message along with the real-time map.

The communicator 150 transmits the transmission message to the target vehicle, and receives the vehicle-associated messages including the second message from the neighboring vehicles including the target vehicle. The vehicle-associated messages include the location information of the neighboring vehicles, and the vehicle information of the neighboring vehicles. The vehicle information includes models, colors, identification (ID) numbers, full widths, and/or weights of the neighboring vehicles. The vehicle-associated messages are, for example, vehicle-to-anything or vehicle-to-everything (V2X) messages.

Further, the processor 130 performs at least one method described with reference to FIGS. 1 through 11. The processor 130 executes a program stored on a non-transitory computer readable medium, and may be configured to control the transmission apparatus 100. The transmission apparatus 100 is connected to an external device, for example, a personal computer or a network, through the communicator 150 and exchanges data with the external device.

The at least one method described with reference to FIGS. 1 through 11 may be implemented in a tablet computer, a smart phone, an intelligent automobile, or a wearable device, or is implemented in a form of a chip and embedded in a smart phone, a wearable device, or an intelligent automobile.

Figure 2:
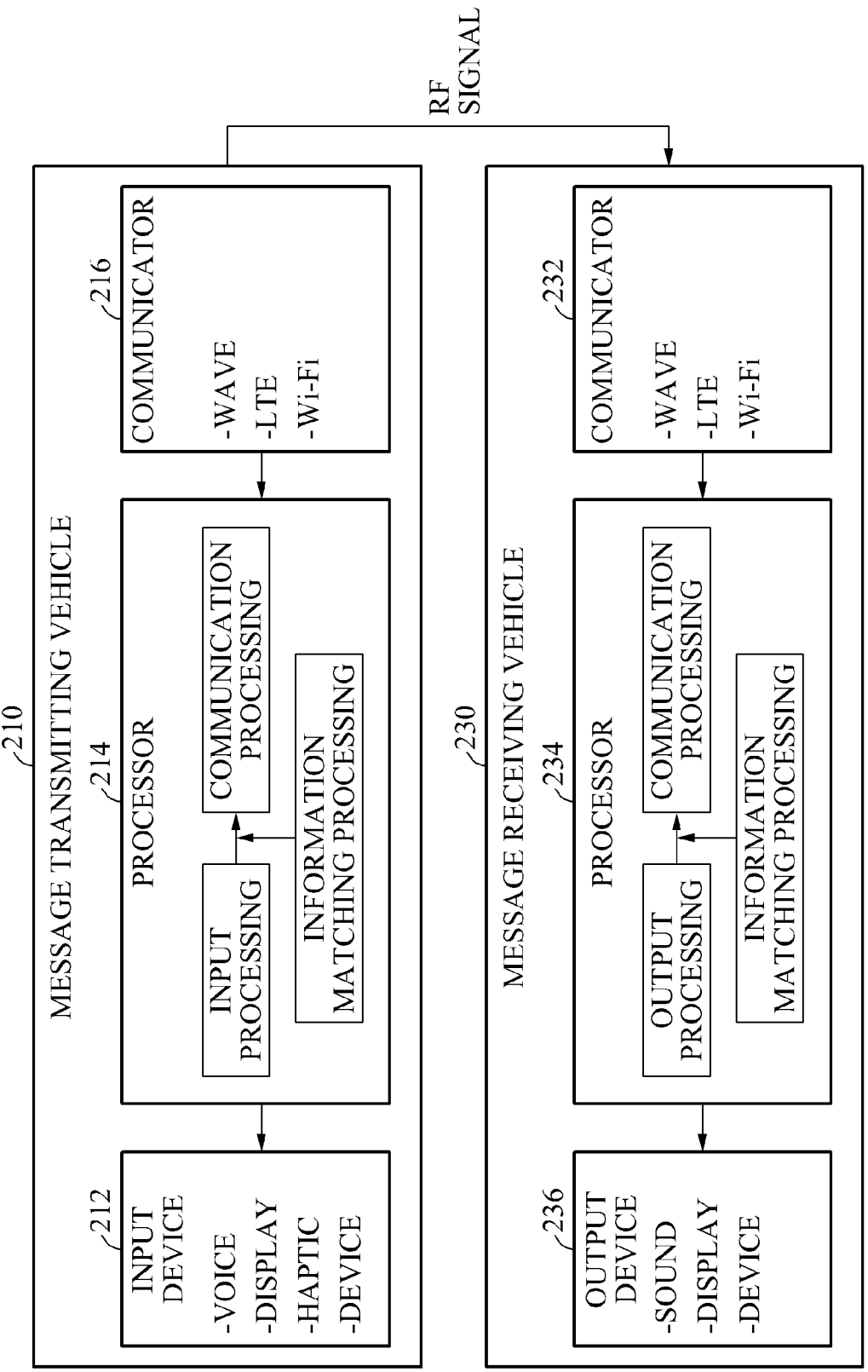
FIG. 2 is a block diagram illustrating an example of a process of transmitting messages between vehicles including apparatuses for transmitting messages between vehicles.

FIG. 2 is a block diagram illustrating an example of a process of transmitting messages between vehicles including apparatuses for transmitting messages between vehicles. Referring to FIG. 2, a message transmitting vehicle 210 and a message receiving vehicle 230 communicating with each other using radio frequency (RF) signals are illustrated.

In response to a first message being input from a user aboard the message transmitting vehicle 210 through an input device 212, a processor 214 processes the first message to be a transmission message based on radio communication standards. For example, the first message includes message content defined by the user, and predetermined instructions.

The processor 214 performs input processing to interpret the first message and identification information of a target vehicle included in the first message. The target vehicle refers to a vehicle or vehicles targeted to receive the first message. That is, there may be a single target vehicle or a plurality of target vehicles. For example, the identification information of the target vehicle is an ID number of the target vehicle.

For example, in order for a user to transmit a message saying "the trunk is open" to a vehicle driving ahead, the user may indicate an instruction, such as the phrase "input" which is an instruction indicating an input of a message, recite the ID number of the target vehicle to which the message is to be transmitted, and input the message. In this example, the user inputs the message and/or the instruction using his or her voice, or inputs the message and/or instruction through a pen input or a touch input using, for example, a virtual keyboard displayed on a display. When the message is fully input, the user issues another instruction, such as "send," which is an instruction to transmit the message and information related to the target vehicle, thereby transmitting the message to the target vehicle.

As such, the first message input through the input device 212 includes predetermined instructions such as "input," "send," etc., the identification information of the target vehicle, and actual message content to be transmitted.

The processor 214 classifies the instructions, the identification information of the target vehicle and the message content included in the first message, and separates the message content from the first message. The processor 214 processes the separated message content to be a transmission message suitable for radio communication.

The processor 214 generates a real-time map using processed information and the location information of the vehicle, the location information of the neighboring vehicles, and/or the vehicle information of the neighboring vehicles. Using this information, the processor 214 processes the first message to be a transmission message suitable for a communicator of the target vehicle, for example, the message receiving vehicle 230, based on the generated real-time map and the identification information of the vehicle. A communicator 216 transmits, to the target vehicle, for example, the message receiving vehicle 230, the transmission message using RF signals through long-term evolution (LTE), wireless-fidelity (Wi-Fi), and/or other communication networks.

The message receiving vehicle 230 receives the transmission message through a communicator 232. A processor 234 of the message receiving vehicle 230 performs processing using the vehicle information and the location information included in the transmission message, and performs information matching processing to update a real-time map based on the interpreted information. The processor 234 obtains information related to a vehicle transmitting the transmission message, for example, a location and an ID number of the vehicle, based on the updated real-time map. The processor 234 performs output processing to transform the transmission message to be suitable for an output device 236 of the message receiving vehicle 230.

The processor 234 transfers the transmission message to the output device 236. In this example, the processor 234 transforms the transmission message to be information in a form suitable for the output device 236 and transmits the processed transmission message. For example, in response to the output device 236 being a mobile device of a user on the message receiving vehicle 230, the processor 234 processes the transmission message and the information related to the vehicle transmitting the transmission message to be suitable for the mobile device. For example, the processor 234 transforms the transmission message to be provided through a sound, an oscillation, and/or a display of the mobile device.

For example, if output device 236 is determined to be a display, the processor 234 transforms the transmission message and the information related to the vehicle transmitting the transmission message to be expressed into a text, a bubble, and/or an icon on a real-time map to be displayed through the display. The display outputs the transmission message and the information related to the neighboring vehicle transmitting the transmission message along with the real-time map. In this example, the display includes a display, for example, a center fascia monitor positioned in a center fascia or instruments of the message receiving vehicle 230, a cluster, a head up display (HUD), and/or a display of a navigation system, or any device aboard the vehicle that may visually expressing a message.

For example, if the output device 236 is determined to be a speaker, the processor 234 transforms the transmission message and the information related to the vehicle transmitting the transmission message into an audio signal.

Figure 3:
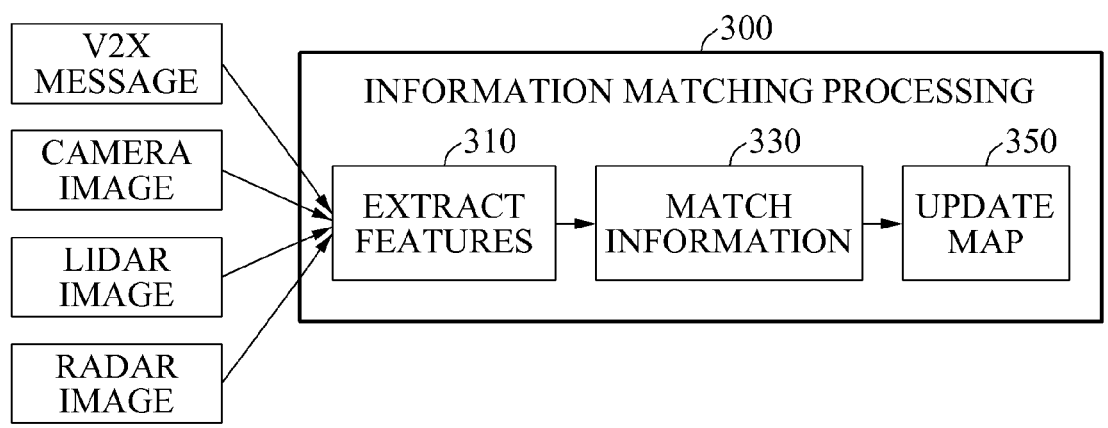
FIG. 3 is a block diagram illustrating an example of an operation of a processor in an apparatus for transmitting messages between vehicles.

FIG. 3 is a diagram illustrating an example of operating of a processor in an apparatus for transmitting messages between vehicles. Referring to FIG. 3, a process 300 of performing information matching processing in a processor is illustrated. In operation 310, the processor extracts features of respective neighboring vehicles by analyzing a V2X message received from a communicator, and images received from a sensor, for example, a vision sensor, a camera, a LIDAR, and/or a RADAR. In detail, the processor extracts, from the V2X message, location information of a vehicle transmitting the message, vehicle information of the vehicle transmitting the message, and/or vehicle information of neighboring vehicles. The vehicle information includes, for example, models, ID numbers, full widths, and weights of the vehicle and the neighboring vehicles. Further, the processor extracts location information of the neighboring vehicles, and other information, such as distances between vehicles, license plates, and/or colors of the neighboring vehicles from an image received from the vision sensor.

In operation 330, the processor matches the extracted features for each vehicle. In detail, "matching" refers to the processor verifying a reliability of information matched based on duplicated vehicle information or location information. The processor updates a vehicle feature database by adding the extracted features to the vehicle feature database, or editing entries already in the vehicle feature database.

In operation 350, the processor updates a real-time map with real-time location information and vehicle information of a vehicle for which information matching is completed in response to the completion of the information matching. Although one vehicle is described in this embodiment, a person having skill in the art would appreciate that more than one vehicle may be implemented.

Figure 4:
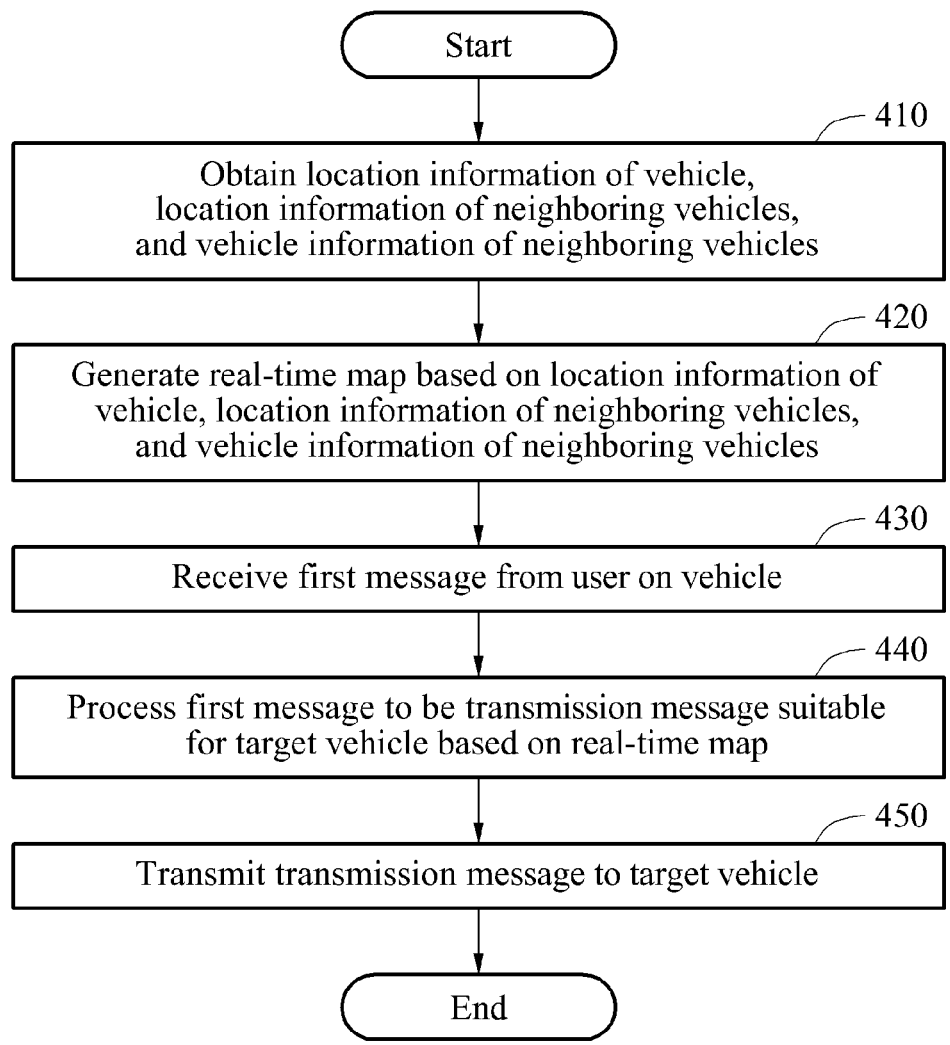
FIG. 4 is a flowchart illustrating an example of a method of transmitting messages between vehicles.

FIG. 4 is a flowchart illustrating an example of a method of transmitting messages between vehicles. Referring to FIG. 4, in operation 410, a transmission apparatus obtains location information of a vehicle, location information of vehicles neighboring the vehicle, and/or vehicle information of the neighboring vehicles. In operation 420, the transmission apparatus generates a real-time map based on the location information of the vehicle, the location information of the neighboring vehicles, and/or the vehicle information of the neighboring vehicles.

In operation 430, the transmission apparatus receives a first message from a user on, i.e. aboard, the vehicle. In a case in which a first message is not input from the user, the transmission apparatus outputs the generated real-time map through a display.

In operation 440, the transmission apparatus transforms the first message to a format suitable for a target vehicle based on the real-time map. More specifically, the transmission apparatus interprets the first message and identification information of the target vehicle included in the first message, and transforms the first message to be in a format suitable for the target vehicle based on, for example, the identification information of the target vehicle and the real-time map.

In operation 450, the transmission apparatus transmits the transmission message to the target vehicle.

Figure 5:
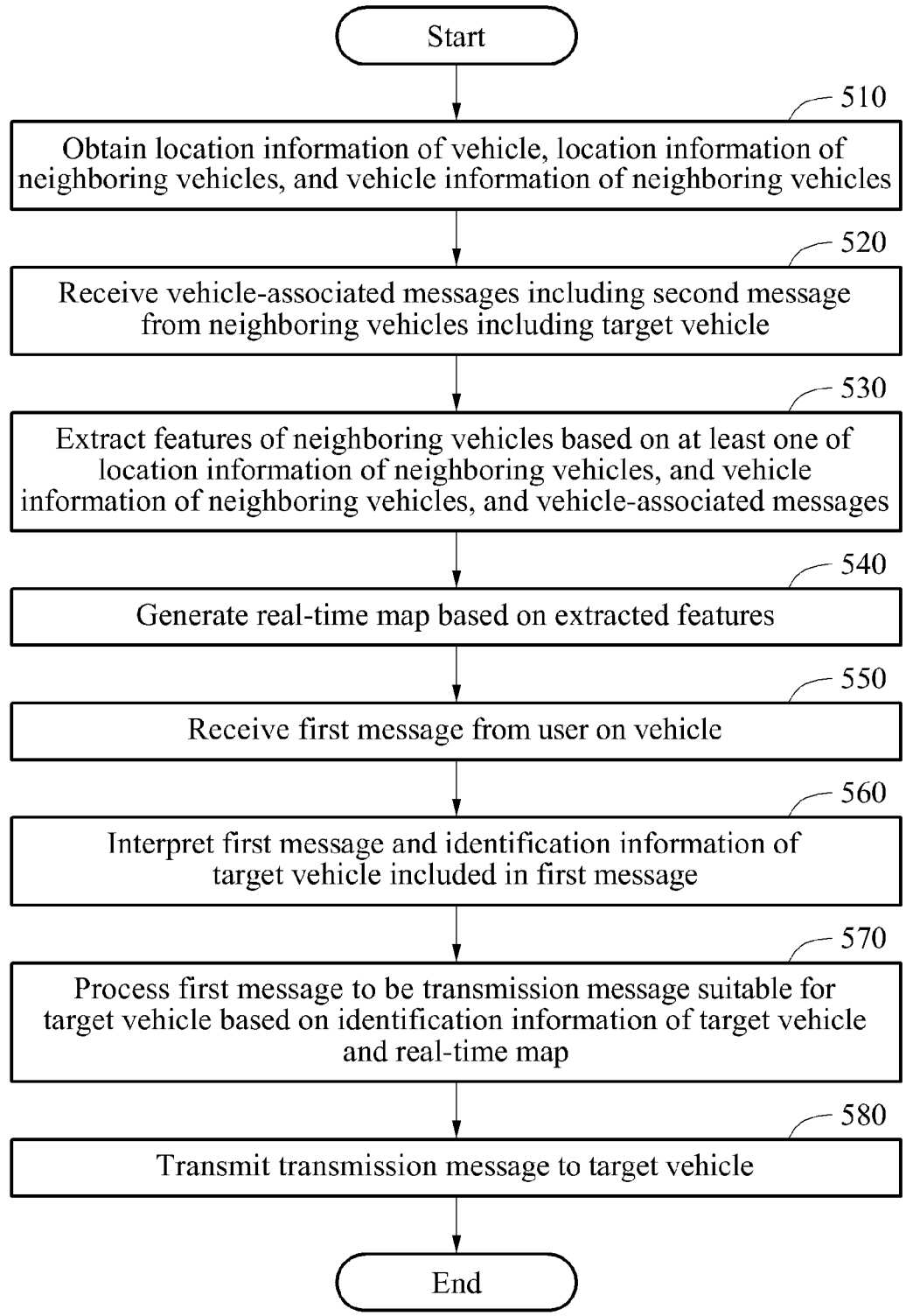
FIG. 5 is a flowchart illustrating an example of a method of transmitting messages between vehicles.

FIG. 5 is a flowchart illustrating an example of a method of transmitting messages between vehicles. Referring to FIG. 5, in operation 510, a transmission apparatus obtains location information of a vehicle, location information of vehicles neighboring the vehicle, and/or vehicle information of the neighboring vehicles. In operation 520, the transmission apparatus receives vehicle-associated messages including a second message from the neighboring vehicles, including a target vehicle. The vehicle-associated messages include the location information of the neighboring vehicles and the vehicle information of the neighboring vehicles. The vehicle information of the neighboring vehicles may include, for example, respective models, colors, ID numbers, full widths, and weights of the neighboring vehicles.

In operation 530, the transmission apparatus extracts features of the respective neighboring vehicles based on at least one of the location information of the neighboring vehicles, the vehicle information of the neighboring vehicles, or the vehicle-associated messages. In operation 540, the transmission apparatus generates a real-time map based on the extracted features. In an example, two vehicles including a vehicle A and a vehicle B, may be near the vehicle including the transmission apparatus. The transmission apparatus extracts a feature of the vehicle A, for example, a white SUV positioned 10 meters (m) ahead on the left, and a feature of the vehicle B, for example, a black taxi positioned 15 m behind, based on the received vehicle-associated messages and the sensed vehicle information of the neighboring vehicles. The transmission apparatus collects the feature of the vehicle A and the feature of the vehicle B and expresses the collected features on the real-time map.

In operation 550, the transmission apparatus receives a first message from a user aboard the vehicle. In operation 560, the transmission apparatus interprets the first message and identification information of the target vehicle included in the first message.

In operation 570, the transmission apparatus processes (i.e. transforms) the first message to be in a format suitable for the target vehicle based on the identification information of the target vehicle and the real-time map. For example, the transmission apparatus may divide the message into instructions, the identification information of the target vehicle, and message content included in the first message. The transmission apparatus separates the message content from the first message, and processes (i.e. transform) the separated message content to be suitable for radio communication of the target vehicle. In this example, a transmission address and a direction of the transmission message are verified based on the identification information of the target vehicle and the real-time map.

In operation 580, the transmission apparatus transmits the transmission message to the target vehicle.

Figure 6:
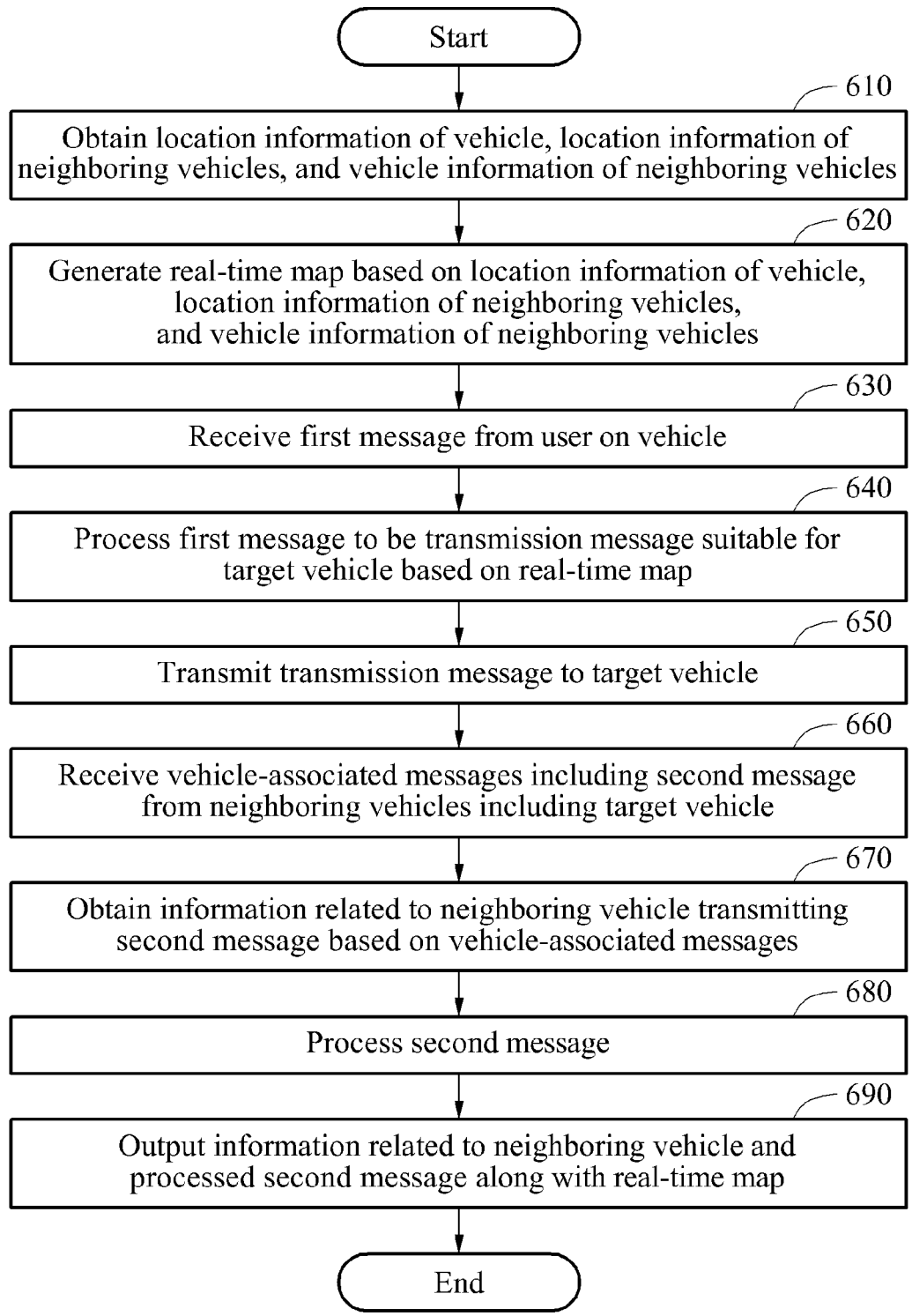
FIG. 6 is a flowchart illustrating an example of a method of transmitting messages between vehicles.

FIG. 6 is a flowchart illustrating an example of a method of transmitting messages between vehicles. Referring to FIG. 6, a series of operations in which a vehicle transmits a transmission message to a target vehicle and the target vehicle processes the transmission message are illustrated. Operations 610 through 650 may be similar to operations 410 through 450 of FIG. 4, as only an example. Thus, descriptions of these will be omitted herein for conciseness.

In operation 660, the transmission apparatus receives vehicle-associated messages including a second message from neighboring vehicles including the target vehicle.

In operation 670, the transmission apparatus obtains information related to a neighboring vehicle transmitting the second message based on the vehicle-associated messages. In operation 680, the transmission apparatus processes the second message. The transmission apparatus processes (i.e. transforms) the second message into a format to be suitable for the corresponding vehicle or to be suitable for an output device of the corresponding vehicle. A method of processing (i.e. transforming) the second message in the transmission apparatus will be described with reference to FIG. 7.

In operation 690, the transmission apparatus outputs the information related to the neighboring vehicle by transmitting the second message and the processed second message along with the real-time map.

Figure 7:
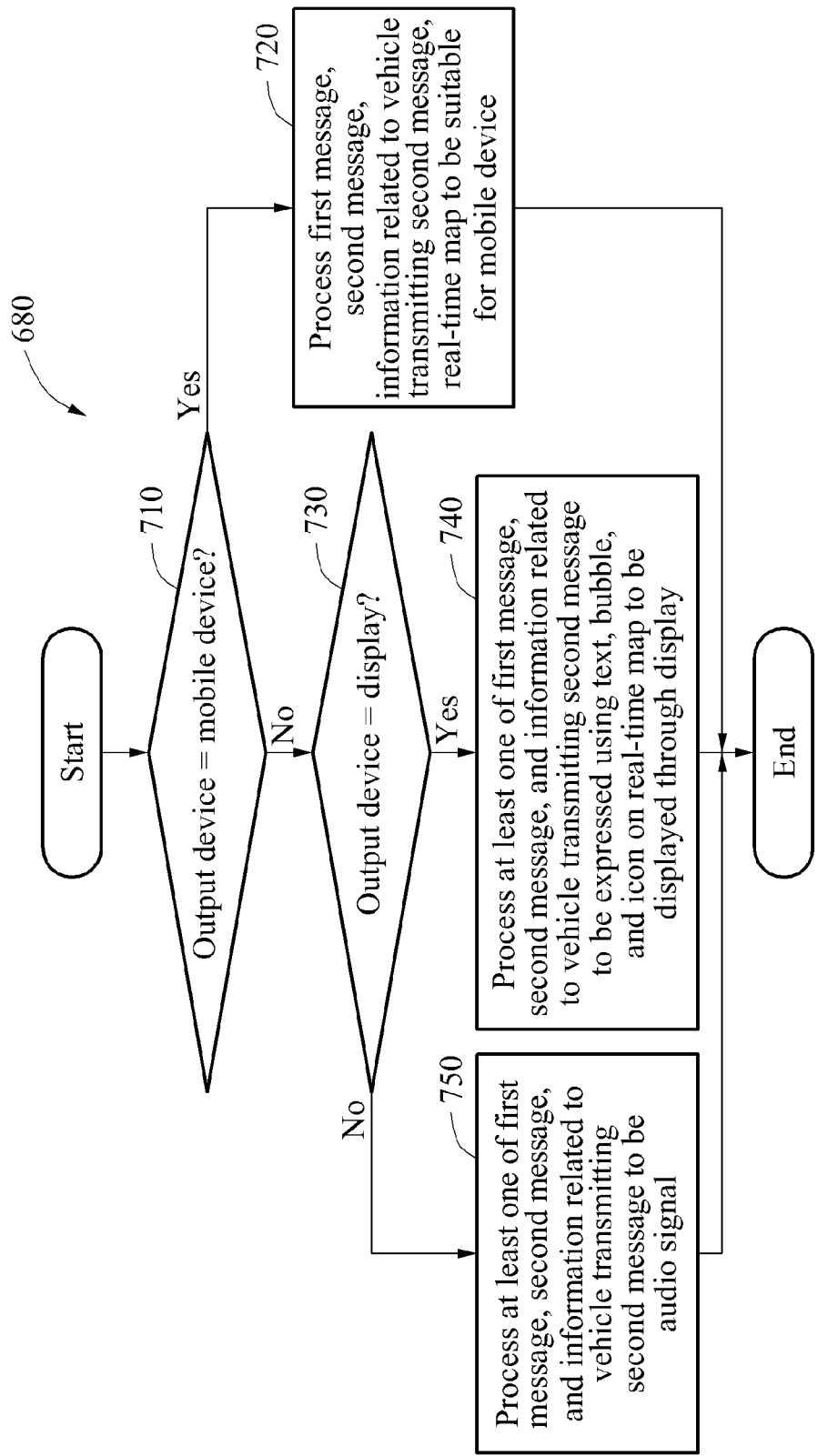
FIG. 7 is a flowchart illustrating an example of a method of processing a second message.

FIG. 7 is a flowchart illustrating an example of a method of processing a second message. Referring to FIG. 7, in operation 710, the transmission apparatus determines whether an output device of the corresponding vehicle is a mobile device of a user. In response to determination that the output device is the mobile device of the user, the transmission apparatus processes (i.e. transforms) the first message, the second message, the information related to the neighboring vehicle transmitting the second message, and the real-time map to be suitable for the mobile device in operation 720. The transmission apparatus transforms the second message into a format to be provided through, for example, a sound, an oscillation, and/or a display of the mobile device.

In response to verification that the output device is not the mobile device, the transmission apparatus determines whether the output device is a display provided in the vehicle in operation 730. In response to determination that the output device is the display, the transmission apparatus processes at least one of the first message, the second message, or the information related to the neighboring vehicle transmitting the second message to be displayed through the display. In operation 740, the transmission apparatus processes (i.e. transforms) message content to be expressed using a text, a bubble, and an icon on the real-time map.

In response to determination that the output device is not the display, the transmission apparatus processes (i.e. transforms) at least one of the first message, the information related to the neighboring vehicle transmitting the second message, or the second message to into an audio signal to be provided through a speaker in operation 750.

Figure 8:
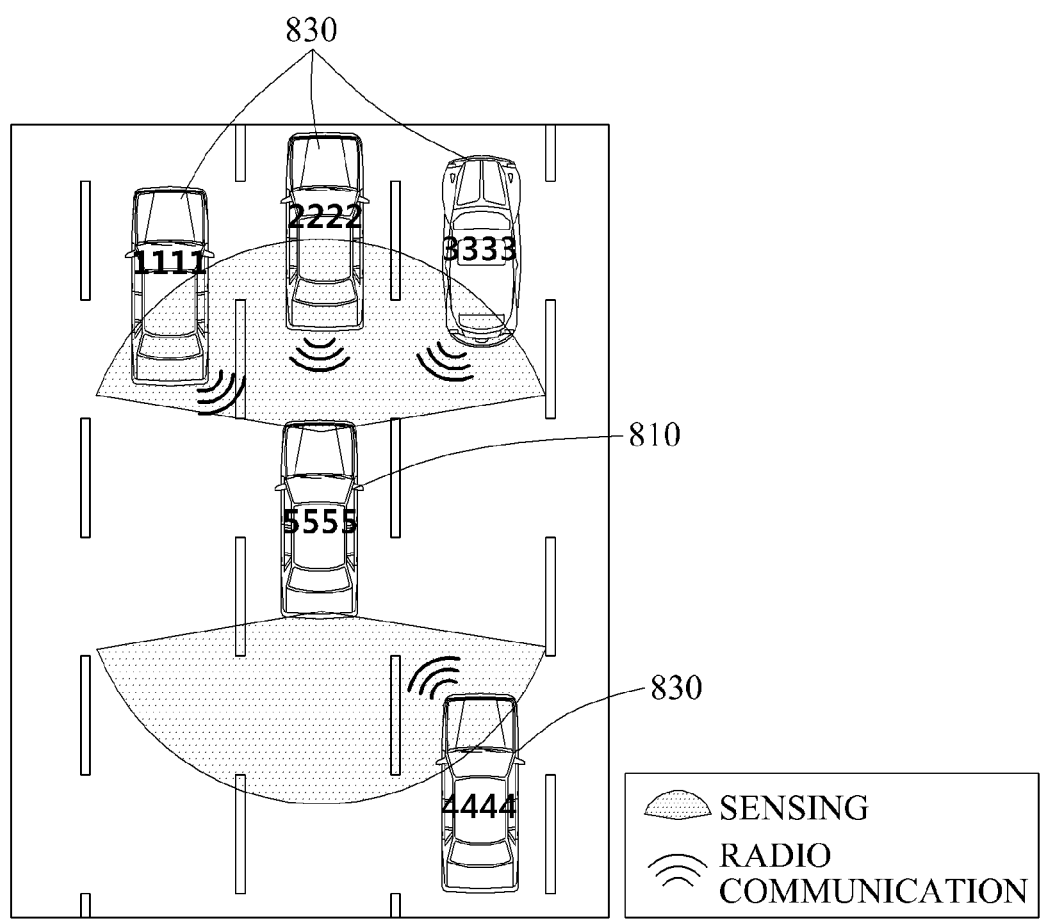
FIG. 8 is a diagram illustrating an example of a communication environment between a first vehicle and neighboring vehicles including apparatuses for transmitting messages between vehicles.
Figure 9:
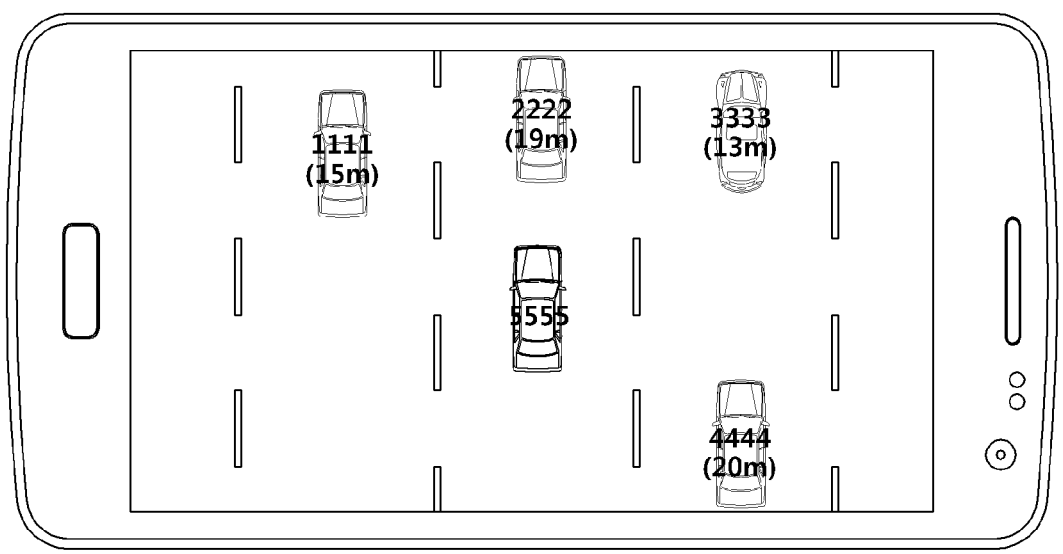
FIG. 9 is a diagram illustrating an example of a real-time map output in the first vehicle in the environment of FIG. 8.

FIG. 8 is a diagram illustrating an example of a communication environment between a first vehicle and neighboring vehicles including apparatuses for transmitting messages between vehicles, and FIG. 9 is a diagram illustrating an example of a real-time map output in the first vehicle in the environment of FIG. 8.

Referring to FIG. 8, a process in which a first vehicle 810 senses and receives information of neighboring vehicles 830 through a sensor and a communicator included in the first vehicle 810 is illustrated. In the example of FIG. 8, an ID number of the first vehicle 810 is "5555", and ID numbers of the neighboring vehicles 830 are "1111", "2222", "3333", and "4444". However, these ID numbers are arbitrary and any method of identification, such as, using numbers, letters, codes, icons, etc. are possible.

The first vehicle 810 may receive (e.g. collect) information related to the neighboring vehicles 830 by sensing a front or rear side of the first vehicle 810 through, for example, a vision sensor. The first vehicle 810 obtains location information of the neighboring vehicles 830 by transmitting and receiving periodical messages, for example, basic safety messages (BSMs) through radio communication between vehicles. In this example, the location information of the neighboring vehicles 830 may include, for example, latitudes, longitudes, and heights of the neighboring vehicles 830.

The first vehicle 810 calculates relative distances between the first vehicle 810 and the neighboring vehicles 830 based on the location information of the neighboring vehicles 830, and may use the calculated distances to form a real-time map with respect to the neighboring vehicles 830 based on calculation results. The first vehicle 810 determines distances from the neighboring vehicles "1111", "2222", and "3333" positioned ahead, and a distance from the neighboring vehicle "4444" positioned behind based on the location information of the neighboring vehicles 830 by sensing of the front side and the rear side of the first vehicle 810. Further, the first vehicle 810 matches vehicle information of the neighboring vehicles 830 collected through vehicle-associated messages transmitted through communication between vehicles, and displays a real-time map as shown in FIG. 9. Here, the vehicle information of the neighboring vehicles 830 may include, for example, corresponding models, colors, ID numbers, full widths, and weights of the neighboring vehicles 830.

Referring to FIG. 9, a real-time map output through a display included in the first vehicle 810 is illustrated. Relative distances from the (arbitrarily named here for the sake of convenience) neighboring vehicles "1111", "2222", "3333", and "4444" are calculated based on information obtained by the first vehicle "5555." Identification information, for example, license plate information of the neighboring vehicles photographed by a vision sensor are matched and displayed on the real-time map. In this example, information related to the first vehicle "5555" is displayed or is not displayed on the real-time map.

Figure 10:
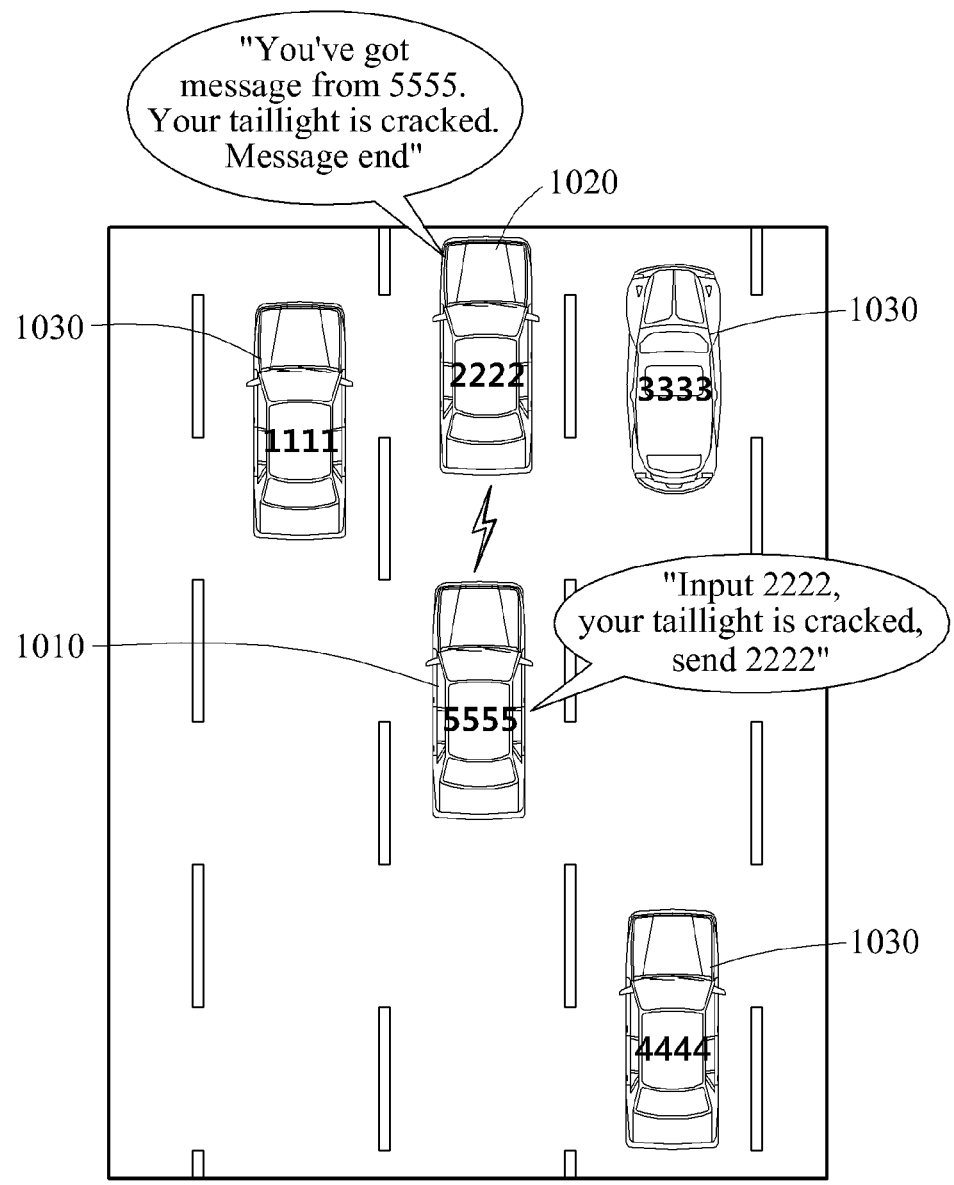
FIG. 10 is a diagram illustrating an example of an environment in which a transmission message is transmitted from a first vehicle to a target vehicle, the first vehicle and the target vehicle including apparatuses for transmitting messages between vehicles.
Figure 11:
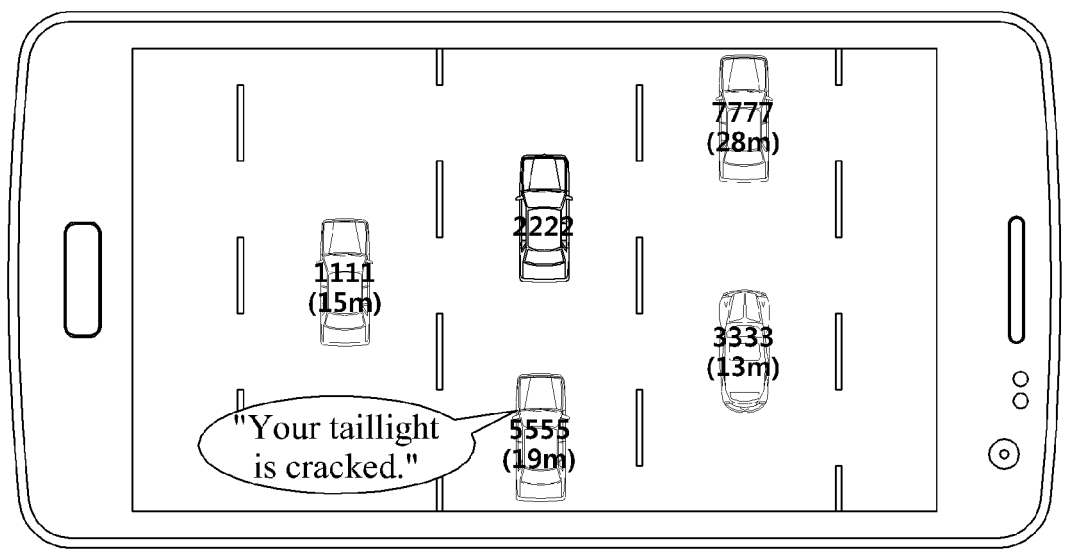
FIG. 11 is a diagram illustrating an example of a real-time map output in the target vehicle in the environment of FIG. 10.

FIG. 10 is a diagram illustrating an example of an environment in which a transmission message is transmitted from a first vehicle to a target vehicle, the first vehicle and the target vehicle including apparatuses for transmitting messages between vehicles, and FIG. 11 is a diagram illustrating an example of a real-time map output in the target vehicle in the environment of FIG. 10. Referring to FIG. 10, a situation in which a transmission message is transmitted and received between a first vehicle 1010 and a target vehicle 1020 is illustrated.

For example, a driver of the first vehicle 1010 viewing neighboring vehicles 1030 notices damage to a taillight of the target vehicle 1020. The driver of the first vehicle 1010 transmits a message to inform a driver of the target vehicle 1020 of such damage.

The driver of the first vehicle 1010 may say or otherwise input an instruction such as "input," which is an instruction indicating a message input, and an ID number "2222" of the target vehicle 1020. In response to the input of the instruction "input" indicting a message input and an ID number "2222" of the target vehicle 1020, a transmission apparatus of the first vehicle 1010 may determine that content input from the driver of the first vehicle 1010 corresponds to content of a message to be transmitted to the target vehicle 1020.

Continuing the example, the driver of the first vehicle 1010 says the message content: "your taillight is cracked", and says "send 2222". In response to the input of the instruction "send", a processor of the first vehicle 1010 terminates the message input, and transmits, to a communicator, an instruction to transmit the input message to the target vehicle 1020 "2222".

The corresponding message is wirelessly transmitted to the target vehicle 1020, processed by a processor of the target vehicle 1020, and updated in a real-time map of the target vehicle 1020 as shown in FIG. 11. In this example, the processor of the target vehicle 1020 determines an ID of a vehicle, for example, the first vehicle 1010, transmitting the message, and informs a user of the target vehicle 1020 of the ID number "5555" of the first vehicle 1010 obtained based on vehicle-associated messages received through a sensor or a communicator of the target vehicle 1020 using a sound or an indication on the real-time map.

The message content "your taillight is cracked" received by the target vehicle 1020, information related to the vehicle transmitting the corresponding message, for example, the ID number "5555", and information related to the neighboring vehicles, for example, ID numbers of the neighboring vehicles and relative distances between the target vehicle 1020 and the neighboring vehicles, are expressed on the real-time map displayed on the display. In this example, the message content "your taillight is cracked" is processed (i.e. transformed) by the processor into a format to be expressed using a text, a bubble, and an icon on the real-time map.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art with a full understanding of the present disclosure will appreciate that a processing device may include multiple processing elements and multiple types of processing elements. For example, a processing device may include multiple processors or a processor and a controller. Different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for transmitting messages between vehicles, the apparatus comprising:
    a sensor configured to:
        sense location information of a vehicle, wherein a user of the apparatus is aboard the vehicle; and
        sense location information of vehicles neighboring the vehicle and vehicle information of the neighboring vehicles;
    an input device configured to receive a first message from the user aboard the vehicle;
    a processor configured to:
        generate a map based on the sensed location information of the vehicle, and at least one of the sensed location information of the neighboring vehicles and the vehicle information of the neighboring vehicles; and
        transform the first message into a transmission message;
    an output device configured to output the map and the first message; and
    a communicator configured to transmit the transmission message to a target vehicle, and receive a second message from the neighboring vehicles including the target vehicle.

2. The apparatus of claim 1, wherein the processor is configured to:
    extract respective features of the neighboring vehicles based on the location information of the neighboring vehicles, and at least one of the vehicle information of the neighboring vehicles, or the second message; and
    generate the map based on the extracted features.

3. The apparatus of claim 1, wherein the processor is configured to:
    receive the first message comprising an instruction, contents, and identification information of the target vehicle, and
    transform the first message into the transmission message, based on the identification information of the target vehicle and the map.

4. The apparatus of claim 1, wherein the second message comprises the location information of the neighboring vehicles, and the vehicle information of the neighboring vehicles, the vehicle information comprising at least one of a model, a color, an identification number, a full width, or a weight of the corresponding neighboring vehicles.

5. The apparatus of claim 1, wherein the processor is configured to receive information related to a neighboring vehicle transmitting the second message based on the second message, and update the map based on the received information related to the neighboring vehicle.

6. The apparatus of claim 5, wherein the processor is configured to transform the second message into a format based on a characteristic of the output device.

7. The apparatus of claim 6, wherein the output device is configured to output the information related to the neighboring vehicle and the transformed second message along with the map.

8. The apparatus of claim 7, wherein the output device comprises at least one of a speaker, a display, or a mobile device carried by the user, and
    the output device is configured to output at least one of the first message, the information related to the neighboring vehicle, or the transformed second message using at least one of the speaker, the display, or the mobile device.

9. The apparatus of claim 8, wherein, in response to the output device being the mobile device, the processor is configured to transform at least one of the first message, the information related to the neighboring vehicle, or the second message into a format suitable for the mobile device.

10. The apparatus of claim 8, wherein, in response to the output device being the display, the processor is configured to transform at least one of the first message, the information related to the neighboring vehicle, or the second message into a format that uses at least one of a text, a bubble, or an icon on a map displayed on the display.

11. The apparatus of claim 1, wherein the sensor comprises:
at least one of a global positioning system (GPS) configured to sense the location information of the vehicle;
a vision sensor and/or a camera configured to photograph the location information of the neighboring vehicles and the vehicle information of the neighboring vehicles; and
a LIDAR or a RADAR configured to sense the location information of the neighboring vehicles and the vehicle information of the neighboring vehicles.

12. The apparatus of claim 11, wherein the processor is configured to verify identification numbers of the neighboring vehicles photographed by the vision sensor and/or the camera and vehicle information extracted from the second message, and transmit a matching result in the map.

13. The apparatus of claim 1, wherein the input device comprises at least one of a microphone, a touch display, a user interface (UI) comprising a haptic interface, a mobile device carried by the user, and a mobile device carried by a passenger in the vehicle, and
the input device is configured to receive the first message from the user through at least one of the microphone, the touch display, the UI, the mobile device carried by the user, or the mobile device carried by the passenger.

14. The apparatus of claim 1, wherein the map is generated in real-time, and is updated in real-time based on the sensed location information of the vehicle, and the at least one of sensed location information of the neighboring vehicles, and vehicle information of the neighboring vehicles.

15. The apparatus of claim 1, wherein the transmitting of the transmission message comprises transmitting a user selected message to the target vehicle from the user aboard the vehicle.

16. The apparatus of claim 1, wherein the sensing of the location information of the vehicles neighboring the vehicle and the vehicle information of the neighboring vehicles is by transmitting identification (ID) information in transit real-time.

17. The apparatus of claim 1, wherein the input device is further configured to generate the first message received from the user in real-time while the user is onboard the vehicle.

18. The apparatus of claim 1, wherein the processor is configured to:
interpret the first message and identification (ID) information of the target vehicle included in the first message, and
transform the first message to be a transmission message suitable for the target vehicle based on the ID information of the target vehicle and a real-time map.

19. A method performed by an apparatus for transmitting messages between vehicles, the method comprising:
sensing, using a sensor, location information of a vehicle, wherein a user of the apparatus is aboard the vehicle;
sensing, using the sensor, location information of vehicles neighboring the vehicle comprising a target vehicle and vehicle information of the neighboring vehicles;
generating a map based on the sensed location information of the vehicle, and at least one of the sensed location information of the neighboring vehicles, and the vehicle information of the neighboring vehicles;
receiving a first message from the user aboard the vehicle;
transforming the first message into a transmission message based on a target vehicle; and
transmitting the transmission message to the target vehicle.

20. The method of claim 19, further comprising:
receiving a second message from the neighboring vehicles comprising the target vehicle.

21. The method of claim 20, further comprising:
receiving information related to a neighboring vehicle transmitting the second message based on the second message; and
updating the map based on the received information related to the neighboring vehicle.

22. The method of claim 20, wherein the generating comprises:
extracting features of the respective neighboring vehicles based on the location information of the neighboring vehicles, and the at least one of the vehicle information of the neighboring vehicles, or the second messages; and
generating the map based on the extracted features.

23. The method of claim 19, wherein the processing comprises:
receiving the first message comprising identification information of the target vehicle; and
transforming the first message into a transmission message based on the identification information of the target vehicle and the map.

24. The method of claim 20, further comprising:
transforming the second message into a format suitable for the vehicle; and
outputting the information related to the neighboring vehicle and the transformed second message along with the map.

25. A non-transitory computer-readable storage medium storing computer readable instructions, which when executed by a computer, cause the computer to perform the method of claim 19.

* * * * *